United States Patent
Melanson et al.

(10) Patent No.: US 7,813,119 B2
(45) Date of Patent: Oct. 12, 2010

(54) METHOD AND APPARATUS FOR REDUCING COUPLED HARD DISK DRIVE VIBRATION

(75) Inventors: Ronald J. Melanson, Woodside, CA (US); David K. McElfresh, San Diego, CA (US); Anton A. Bougaev, La Jolla, CA (US); Aleksey M. Urmanov, San Diego, CA (US); Kenneth C. Gross, San Diego, CA (US)

(73) Assignee: Oracle America, Inc., Redwood Shores, CA (US)

(*) Notice: Subject to any disclaimer, the term of this patent is extended or adjusted under 35 U.S.C. 154(b) by 221 days.

(21) Appl. No.: 11/945,814

(22) Filed: Nov. 27, 2007

(65) Prior Publication Data

US 2009/0135514 A1    May 28, 2009

(51) Int. Cl.
*G06F 1/16* (2006.01)

(52) U.S. Cl. .......................... 361/679.49; 361/679.33; 360/97.01; 360/98.01; 312/223.1; 312/223.2

(58) Field of Classification Search ............ 361/679.33, 361/679.34
See application file for complete search history.

(56) References Cited

U.S. PATENT DOCUMENTS

| | | | | |
|---|---|---|---|---|
| 6,324,056 | B1* | 11/2001 | Breier et al. ............ | 361/679.46 |
| 7,319,586 | B2* | 1/2008 | Hall et al. ............... | 361/679.33 |
| 7,349,205 | B2* | 3/2008 | Hall et al. ............... | 361/679.33 |
| 7,440,273 | B2* | 10/2008 | Chen et al. ............. | 361/679.33 |

* cited by examiner

*Primary Examiner*—Jayprakash N Gandhi
*Assistant Examiner*—Anthony Q Edwards
(74) *Attorney, Agent, or Firm*—Park, Vaughan & Fleming LLP

(57) ABSTRACT

Some embodiments of the present invention provide a system that includes a first hard disk drive (HDD) and a second HDD. Within this system, the first HDD is coupled to the second HDD in a non-parallel configuration, which reduces rotational vibration transmitted between the first HDD and the second HDD.

11 Claims, 4 Drawing Sheets

METHOD AND APPARATUS FOR REDUCING COUPLED HARD DISK DRIVE VIBRATION

BACKGROUND

1. Field

In general, the present invention relates to hard disk drives (HDDs). Specifically, the present invention relates to a method and apparatus for reducing coupled hard disk drive vibrations.

2. Related Art

Vibration-related problems are increasingly prominent in high-performance computer systems, such as servers, mainframes, and supercomputers. These vibration-related problems may be caused by several factors. First, cooling fans have become larger, more numerous, and more powerful to compensate for the increased heat generated by the machines' hardware components. In addition, cheaper and more lightweight materials currently used in chassis and support structures are less effective at dampening vibrations than heavier and more expensive materials. Finally, newer generations of internal hard disk drives (HDDs) are more sensitive to vibration-induced degradation.

Specifically, HDDs have increased in both storage density and performance in accordance with Moore's Law. At these increased densities, a write head of an HDD may be required to hit a track that is less than 20 nanometers in width. In addition, the write head may be separated from a corresponding platter by a distance of several nanometers. Finally, the platter may be spinning at speeds of up to 15,000 revolutions per minute (rpm). These factors have caused the latest generation of HDDs to be more sensitive to vibrations. Consequently, vibration-related problems may cause the HDDs within a computer system to experience reductions in read and write throughput. Moreover, the increased internal latencies caused by the degraded throughput may cause software applications to hang, crash, and/or reboot.

To compensate for internally excited vibrations from components within the computer system and externally excited vibrations propagated from adjacent systems, designers often apply damping materials, such as rubber grommets, foam composites, and/or elastomeric pads to areas within and/or around the computer system. These damping materials may be placed to mechanically isolate individual HDDs from vibration-generating components within the computer system and from vibrations produced by adjacent systems. However, these damping materials may further limit available space inside densely packed computing systems, impede cooling airflow, and degrade with age. Hence, alternative methods for reducing vibrations may preserve performance and throughput while avoiding problems associated with the use of damping materials.

SUMMARY

Some embodiments of the present invention provide a system that includes a first hard disk drive (HDD) and a second HDD. Within this system, the first HDD is coupled to the second HDD in a non-parallel configuration, which reduces rotational vibration transmitted between the first HDD and the second HDD.

In some embodiments, the system includes a third HDD and a fourth HDD. Within the system, the third HDD and the fourth HDD are similarly coupled in a non-parallel configuration.

In some embodiments, the third HDD is parallel to the first HDD and the fourth HDD is parallel to the second HDD.

In some embodiments, the first HDD, the second HDD, the third HDD, and the fourth HDD are placed in an orthogonal array configuration.

In some embodiments, the orthogonal array configuration includes airflow gaps between coupled pairs of HDDs.

In some embodiments, the coupling mechanism rigidly couples the first HDD and the second HDD.

In some embodiments, the first HDD is orthogonal to the second HDD.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Embodiments of the invention present a method and apparatus for reducing vibrations experienced by hard disk drives (HDDs). The HDDs may be installed in a computer system such as a personal computer, server, mainframe, and/or supercomputer. Specifically, embodiments of the invention present a method and apparatus for reducing coupled vibrations between multiple HDDs in a computer system. In one or more embodiments of the invention, pairs of HDDs in the computer system are coupled in a non-parallel configuration. The non-parallel configuration may reduce rotational vibrations transmitted between the HDDs. The non-parallel configuration may correspond to an orthogonal configuration, and the set of HDDs may be placed in an orthogonal array configuration to retain a high packing density. Airflow gaps may be placed between each pair of HDDs in the orthogonal array configuration to promote heat diffusion from the HDDs.

Figure 1:
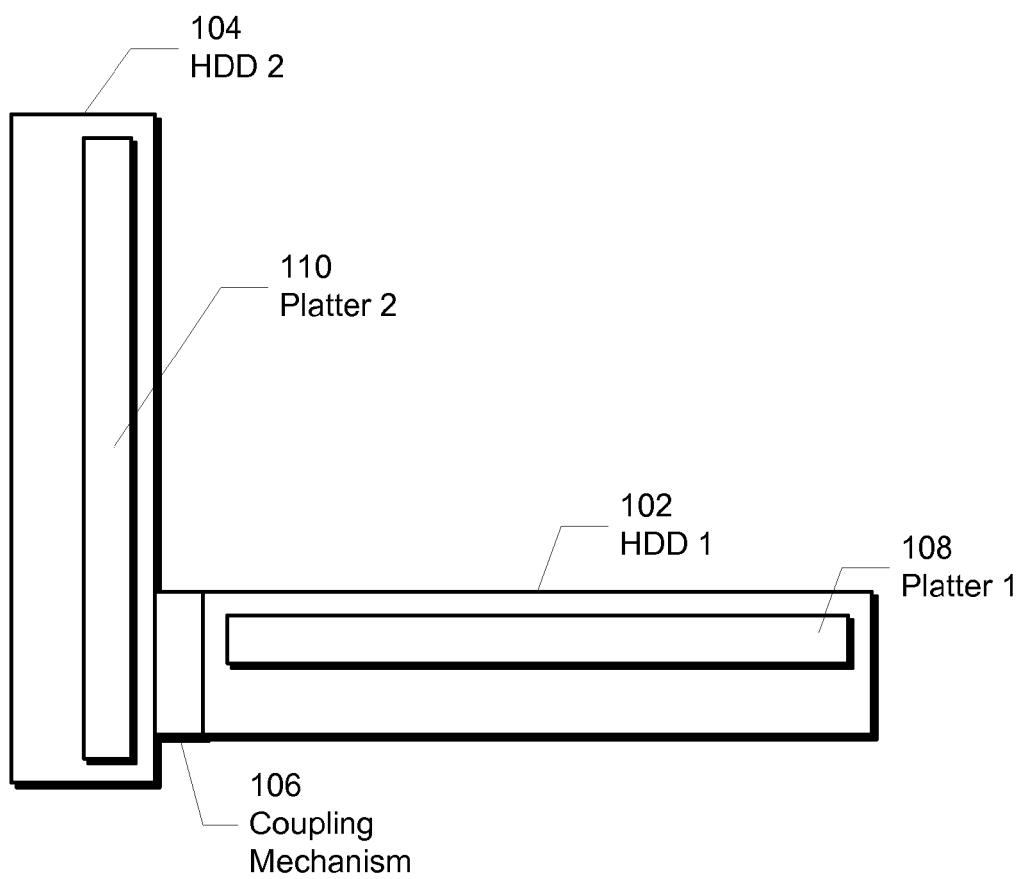
FIG. 1 shows a coupled pair of HDDs in accordance with an embodiment of the present invention.

FIG. 1 shows a coupled pair of hard disk drives (HDDs) in accordance with an embodiment of the present invention. Specifically, FIG. 1 shows a side view of two HDDs (i.e., HDD 1 102, HDD 2 104) connected by a coupling mechanism 106. The HDDs may be installed in a computing system, such as a personal computer, a server, a mainframe, a supercomputer, a network attached storage (NAS) system, a storage area network (SAN) system, and/or other electronic computing device. In addition, the HDDs may act as repositories for digital files from the computing system, which may be read from, written to, modified, and/or organized by a file system associated with the HDDs.

Those skilled in the art will appreciate that both HDD 1 102 and HDD 2 104 are precise mechanical and electronic devices that operate using closely-spaced moving parts. Specifically, each HDD may include one or more rapidly-spinning platters (e.g., platter 1 108, platter 2 110) and one or more heads. The heads may be used to read from and write to sub-micron-sized regions corresponding to bits on the platters. Furthermore, the heads may be positioned in close proximity to the platters. For example, a high-end HDD may spin at 15,000 revolutions per minute (rpm), use read-and-write heads hovering nanometers from the platters, and store nanometer-sized bits on the platters. Advances in HDD technology may continue to produce HDDs with increasing rotational speed and density. Consequently, forces such as vibrations may adversely affect HDD performance and cause problems with latency and/or application execution.

In particular, the HDDs may be sensitive to rotational vibration generated by the spinning platters. Rotational vibration may also be transmitted between two or more HDDs when the HDDs are parallel to one another with little separation and the platters positioned side by side. For example, current parallel configurations of HDDs in computer systems may cause transmission of rotational vibration between the HDDs if damping materials are not applied to the HDDs. The transmitted rotational vibration may further amplify vibration levels experienced by individual HDDs.

As shown in FIG. 1, HDD 1 102 and HDD 2 104 are connected in a non-parallel configuration by coupling mechanism 106. Specifically, HDD 1 102 and HDD 2 104 are positioned orthogonally (i.e., to form a 90 degree angle). In this configuration, the axes of rotation for platter 1 108 and platter 2 110 also form a 90 degree angle, thus reducing rotational vibration transmitted between HDD 1 102 and HDD 2 104 and leveraging gyroscopic stabilization between the two HDDs. In one or more embodiments of the invention, the orthogonal configuration between HDD 1 102 and HDD 2 104 reduces each HDD's sensitivity to vibration by an order of magnitude. As a result, read and write performance may be improved without the use of damping materials by placing HDD 1 102 and HDD 2 104 in an orthogonal configuration.

In one or more embodiments of the invention, HDD 1 102 and HDD 2 104 are rigidly coupled by coupling mechanism 106. For example, coupling mechanism 106 may include one or more rails, brackets, and/or mount points for binding HDD 1 102 and HDD 2 104 together. Coupling mechanism 106 may also bind one or both of the HDDs to a chassis of the computer system. Alternatively, HDD 1 102 and HDD 2 104 may be held in an orthogonal configuration by one or more coupling mechanisms that bind the HDDs to the chassis of the computer system.

Furthermore, HDD 1 102 and HDD 2 104 may be positioned in other non-orthogonal configurations that reduce each HDD's sensitivity to rotational vibration. For example, HDD 1 102 may be positioned at a different angle (e.g., 30 degrees, 45 degrees, 60 degrees, etc.) with respect to HDD 2 104. HDD 1 102 and HDD 2 104 may also intersect at different positions. For example, the side of HDD 1 102 may intersect with the middle of HDD 2 104. In another configuration, the HDDs may be positioned adjacent to one another on the same plane (e.g., horizontally, vertically, etc.) and form a 180 degree angle. In other words, amplified rotational vibration caused by parallel coupling of the two HDDs may be mitigated using a variety of alternative configurations.

Figure 2A:
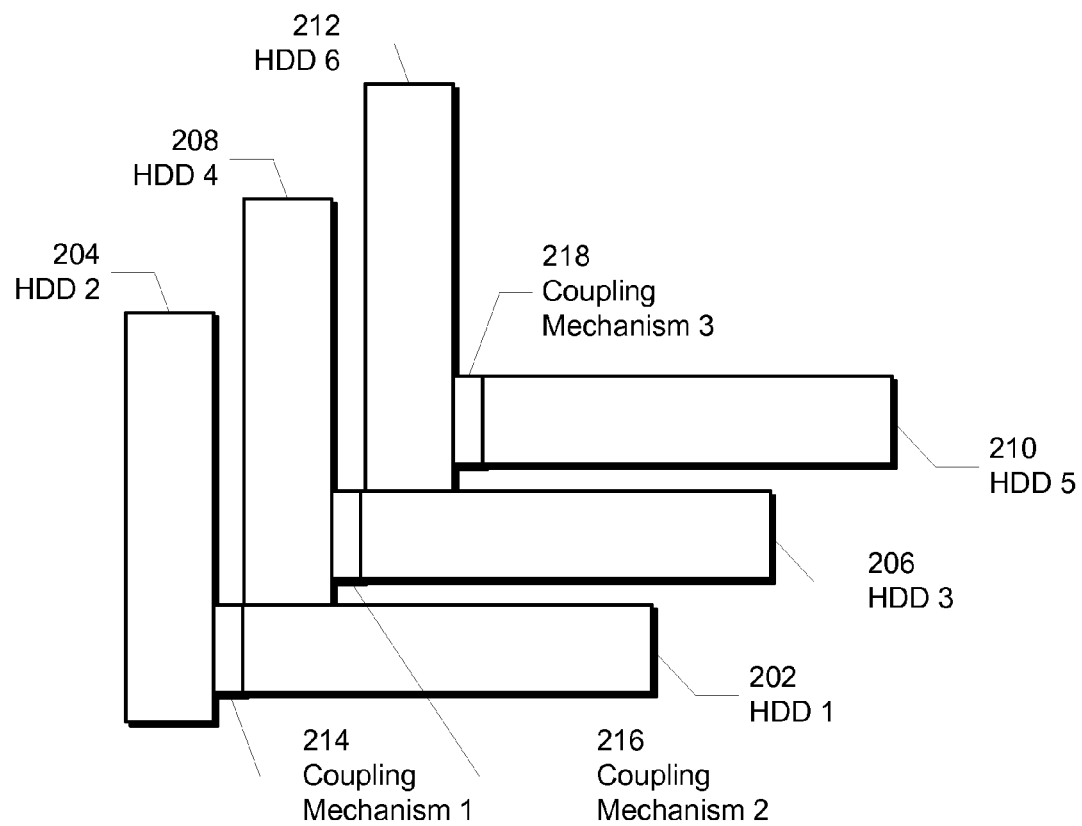
FIG. 2A shows a set of HDDs in an orthogonal array configuration in accordance with an embodiment of the present invention.

FIG. 2A shows a set of HDDs in an orthogonal array configuration in accordance with an embodiment of the present invention. The orthogonal array configuration includes three pairs of HDDs (e.g., HDD 1 202 and HDD 2 204, HDD 3 206 and HDD 4 208, and HDD 5 210 and HDD 6 212) coupled to each other using coupling mechanisms (e.g., coupling mechanism 1 214, coupling mechanism 2 216, coupling mechanism 3 218). In one or more embodiments of the invention, the pairs of HDDs are coupled together in orthogonal configurations, such as the orthogonal configuration illustrated in FIG. 1. The orthogonal array configuration may include additional coupling and/or support structures (not shown) for joining the pairs of HDDs with one another and/or to the chassis of a computer system. Those skilled in the art will appreciate that greater or fewer numbers of HDDs and/or coupling mechanisms may be used in the orthogonal array configuration.

As described above, an orthogonal configuration may minimize rotational vibration transmission and leverage gyroscopic stability between two HDDs. In one or more embodiments of the invention, an orthogonal array configuration as illustrated in FIG. 2A allows for a similar diffusion of rotational vibration while retaining a high packing density among multiple HDDs. Specifically, the orthogonal array configuration reduces the rotational vibration transmitted from one HDD to another because each HDD's axis of rotation is either offset from or perpendicular to another HDD's axis of rotation. In addition, greater structural stability may be achieved by coupling pairs of HDDs in orthogonal configurations and placing the set of HDDs in an orthogonal array configuration.

In one or more embodiments of the invention, the orthogonal array configuration includes airflow gaps between coupled pairs of HDDs. In other words, the HDDs are positioned such that a horizontal airflow gap exists between HDD 1 202 and HDD 3 206 and a vertical airflow gap exists between HDD 2 204 and HDD 4 208. Similarly, a horizontal airflow gap is placed between HDD 3 206 and HDD 5 210, and a vertical airflow gap is placed between HDD 4 208 and HDD 6 212. The airflow gaps enable efficient air cooling of the HDDs and thus may help prevent issues associated with overheating. Those skilled in the art will appreciate that the specific configuration of each coupled HDD pair, as well as the positions of the HDD pairs, may be influenced by the number of HDDs, the physical specifications of each HDD, the physical specifications of the computer system, the efficiency of the cooling system, and/or other factors.

Figure 2B:
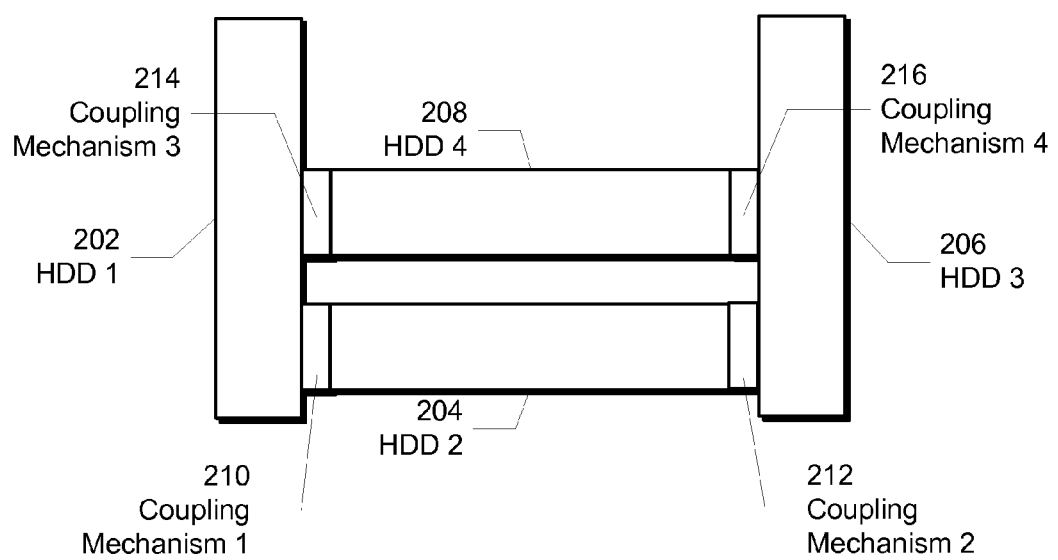
FIG. 2B shows an exemplary HDD configuration in accordance with an embodiment of the present invention.

FIG. 2B shows an exemplary HDD configuration in accordance with an embodiment of the present invention. In particular, FIG. 2B shows four HDDs (e.g., HDD 1 202, HDD 2 204, HDD 3 206, HDD 4 208) joined together using four coupling mechanisms (e.g., coupling mechanism 1 210, coupling mechanism 2 212, coupling mechanism 3 214, coupling mechanism 4 216). The HDDs are positioned such that two coupled pairs of orthogonal HDDs are formed. For example, HDD 1 202 and HDD 2 204 may form an orthogonally coupled pair, and HDD 3 206 and HDD 4 208 may form a second orthogonally coupled pair. On the other hand, HDD 1 202 and HDD 4 208 may form one orthogonally coupled pair, while HDD 2 204 and HDD 3 206 may form the other.

Furthermore, the HDDs are arranged such that two of the HDDs (e.g., HDD 2 204, HDD 4 208) are positioned parallel to one another and in close proximity to one another. However, the amount of vibration experienced by each HDD may still be reduced using the configuration of FIG. 2B because of the stabilizing effect of each orthogonally coupled pair. Rotational vibration between HDD 1 202 and HDD 3 206 is reduced by the physical separation of the two HDDs and the placement of two orthogonal HDDs (e.g., HDD 2 204, HDD 4 208) in between. Similarly, rotational vibration between HDD 2 204 and HDD 4 208 may be mitigated by the four coupling mechanisms and by gyroscopic stabilization provided by HDD 1 202 and HDD 3 206. As with FIG. 2A, the configuration formed by the HDDs also achieves a high packing density and allows for efficient cooling of the HDDs.

Figure 3:
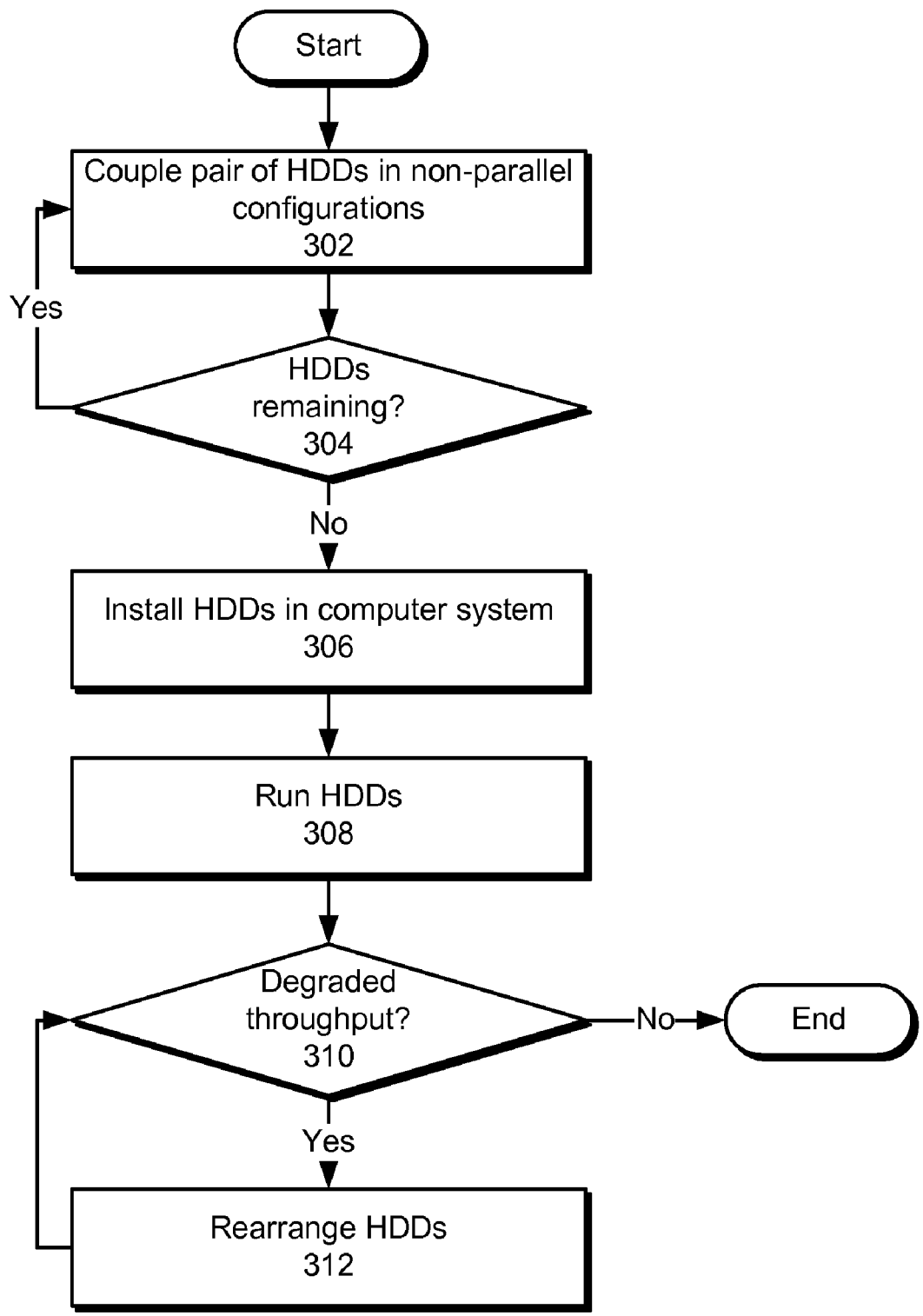
FIG. 3 shows a flowchart of HDD coupling in accordance with an embodiment of the present invention.

FIG. 3 shows a flowchart of HDD coupling in accordance with an embodiment of the present invention. In one or more embodiments of the invention, one or more of the steps may be omitted, repeated, and/or performed in a different order. Accordingly, the specific arrangement of steps shown in FIG. 3 should not be construed as limiting the scope of the invention.

Initially, a pair of HDDs is coupled in a non-parallel configuration (operation 302). The non-parallel configuration may be selected from an orthogonal configuration as well as configurations in which the HDDs form an angle other than 90 degrees. For example, the HDDs may form a 45 degree angle, a 120 degree angle, or even a 180 degree angle. The non-parallel configuration may also vary in the coupling point of the two HDDs. For example, one HDD may be coupled at an angle to the middle of the second HDD, or the HDDs may be coupled near the edges of each HDD. The pair of HDDs may be coupled using one or more coupling mechanisms, such as the coupling mechanism of FIG. 1.

Other HDDs in the computer system may also require coupling. If other HDDs remain (operation 304), the HDDs are coupled in pairs using additional coupling mechanisms. In addition, the remaining HDDs may be coupled using different configurations from each other. For example, one pair of HDDs may be coupled orthogonally, while another pair of HDDs may be coupled to form a 45 degree angle.

The HDDs are installed in the computer system (operation 306). The HDDs may be installed by placing the coupled pairs in appropriate locations (e.g., HDD bays) within the chassis of the computer system and connecting the HDDs to the computer system. The installation may also involve the formatting of the HDDs and/or the installation of software (e.g., applications, drivers, operating system, etc.) associated with the HDDs. As mentioned above, the coupled pairs of HDDs may be physically attached to one another within the chassis using coupling mechanisms and/or support structures. The coupled pairs of HDDs may also be arranged to form an overall configuration, such as an orthogonal array configuration, within the chassis.

The HDDs are run in the computer system (operation 308). While the HDDs are running, the HDDs may be analyzed for degraded throughput (operation 310). If degraded throughput is experienced, the HDDs are rearranged (operation 312). The rearrangement may include placing coupled pairs of HDDs in different locations within the chassis, as well as coupling the HDD pairs in different configurations. The HDDs are checked for degraded throughput and rearranged (operations 310-312) until degraded throughput is no longer found.

The foregoing descriptions of embodiments have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A system for reducing coupled hard disk drive (HDD) vibration, comprising:
   a first, second, third, and fourth HDD,
   a first coupling mechanism configured to couple the first HDD and the second HDD in a non-parallel configuration,
   a second coupling mechanism configured to couple the third HDD and the fourth HDD in a non-parallel configuration, wherein the third HDD is parallel to the first HDD and the fourth HDD is parallel to the second HDD, and wherein the first HDD, the second HDD, the third HDD, and the fourth HDD are placed in an orthogonal array configuration;
   wherein the non-parallel configuration reduces rotational vibration transmitted between the hard disk drives (HDDs); and
   wherein the non-parallel configuration includes airflow gaps between coupled pairs of HDDs.

2. The system of claim 1, wherein the coupling mechanism rigidly couples the first HDD and the second HDD.

3. The system of claim 1, wherein the first HDD is orthogonal to the second HDD.

4. A method for reducing coupled hard disk drive (HDD) vibration, comprising:
   coupling a first HDD and a second HDD in a non-parallel configuration;
   coupling a third HDD and a fourth HDD in a non-parallel configuration;
   installing the first HDD and the second HDD and the third HDD and the fourth HDD in a computer system, wherein the third HDD is installed parallel to the first HDD and the fourth HDD is installed parallel to the second HDD, and wherein the first HDD, the second HDD, the third HDD, and the fourth HDD are placed in an orthogonal array configuration; and
   running the hard disk drives (HDDs);
   wherein the non-parallel configuration reduces rotational vibrations transmitted between the running HDDs; and
   wherein the non-parallel configuration includes airflow gaps between coupled pairs of HDDs.

5. The method of claim 4, wherein the first HDD and the second HDD are rigidly coupled.

6. The method of claim 4, wherein the first HDD is orthogonal to the second HDD.

7. A computer system, comprising:
   a processor;
   a memory;
   a first set of hard disk drives (HDDs) and a second set of hard disk drives, wherein the first and second set of hard disk drives are placed in an orthogonal array configuration; and
   a set of coupling mechanisms configured to couple pairs of HDDs from the set of HDDs in a non-parallel configuration,
   wherein the non-parallel configuration reduces rotational vibration transmitted among the set of HDDs; and
   wherein the non-parallel configuration includes airflow gaps between coupled pairs of HDDs.

8. The computer system of claim 7, wherein the pairs of HDDs are oriented in an orthogonal configuration.

9. The computer system of claim 7, wherein the set of HDDs is placed in an orthogonal array configuration.

10. The computer system of claim 7, wherein the each of the set of coupling mechanisms includes at least one of a bracket, a rail, and a mount point.

11. The computer system of claim 7, wherein the pairs of HDDs are rigidly coupled.

* * * * *